United States Patent Office 3,166,522
Patented Jan. 19, 1965

3,166,522
ORGANOBORON POLYMERS
Kiyoshi Kitasaki, Garden Grove, and George W. Willcockson, Anaheim, Calif., assignors to United States Borax & Chemical Corporation, Los Angeles, Calif., a corporation of Nevada
No Drawing. Filed June 29, 1962, Ser. No. 206,191
13 Claims. (Cl. 260—2)

The present invention relates as indicated to a new class of organoboron polymers and has further reference to a method for preparing these polymers.

It is, therefore, the principal object of the present invention to provide a new class of thermally stable organoboron polymers.

It is a further object of this invention to provide an efficient and economically desirable method for preparing these thermally stable organoboron polymers.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises organoboron polymers having the recurring structural unit

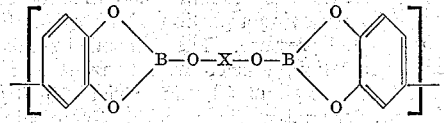

where X is selected from the group consisting of alkylene radicals of from 2 to 20 carbon atoms in length and containing a total of from 2 to 20 carbon atoms, cycloalkylene radicals, the cyclic portion of which is of from 4 to 6 carbon atoms and containing a total of from 4 to 20 carbon atoms, 1,3-phenylene and 1,4-phenylene.

The organoboron polymers of the present invention are thermally stable at temperatures up to 500° C., and they have numerous industrial applications as protective coatings for heat sensitive materials which are to be subjected to high temperature environments. Additionally, the present polymers have excellent adhesive properties, and they have utility in the bonding of such materials as glass, wood and metal, and in the preparation of Fiberglas laminates.

The preparation of the present organoboron polymers can best be illustrated by the following equation:

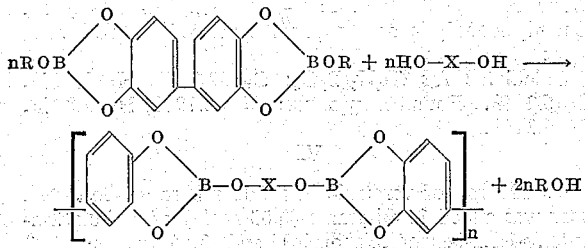

where R is hydrogen, an alkyl radical of from 1 to 8 carbon atoms, phenyl or tolyl, and X is either an alkylene radical of from 2 to 20 carbon atoms in length and containing a total of from 2 to 20 carbon atoms, a cycloalkylene radical, the cyclic portion of which is of from 4 to 6 carbon atoms and containing a total of from 4 to 20 carbon atoms, or a 1,3-phenylene or 1,4-phenylene radical.

The preferred method for performing the foregoing polymerization reaction is a direct single-step process. A 5,5′-bis(2-oxy-1,3,2-benzodioxaborole) and an applicable dihydric alcohol are admixed either in the presence or absence of a solvent which is inert to the reactants. The reaction mixture is then heated under reflux and the alcohol or water reaction by-product is continuously removed from the reaction mass by distillation. After substantially all of the reaction by-product has been removed, the desired organoboron polymer is recovered by standard methods.

As regards the reactants applicable to the present invention, the first of these are the 5,5′-bis(2-oxy-1,3,2-benzodioxaborole) compounds having the formula

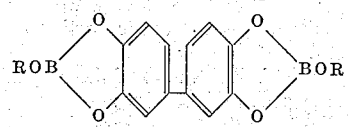

where R is either hydrogen, an alkyl radical of from 1 to 8 carbon atoms, phenyl or tolyl. The 5,5′-bis(2-organooxy-1,3,2-benzodioxaboroles) are prepared by the reaction of an orthoborate ester with bis(3,4-dihydroxyphenyl) and the 5,5′-bis(2-hydroxy-1,3,2-benzodioxaborole) is obtained by the hydrolysis of any of the 5,5′-bis(2-organooxy-1,3,2-benzodioxaborole) compounds.

The following examples are given to illustrate the preparation of the 5,5′-bis(2-oxy-1,3,2-benzodioxaboroles) which are applicable to the present invention:

I

Bis(3,4-dihydroxyphenyl), 4.36 grams (0.02 mole) was suspended in 100 ml. of toluene and heated to 100° C. The suspension was allowed to cool, and 7.52 grams (0.04 mole) of triisopropyl borate in 20 ml. of toluene was added. The reaction mixture was then heated under reflux for about 6 hours, at which time 4.12 grams (94%) of isopropanol had been removed in the form of an isopropanol-toluene azeotrope. Toluene was removed by distillation at reduced pressure to yield 6.53 grams (92.3% yield) of 5,5′-bis(2-isopropoxy-1,3,2-benzodioxaborole). Chemical analysis of the product yielded the following data:

Calculated for $C_{18}H_{20}B_2O_6$: C=61.08%, H=5.70%, B=6.11%. Found in product: C=60.63%, H=5.75%, B=6.07%.

II

Water, 0.72 gram (0.04 mole), was added to a solution of 6.52 grams (0.02 mole) of 5,5′-bis(2-ethoxy-1,3,2-benzodioxaborole) in 120 ml. of veratrole. The mixture was diluted with benzene, cooled and filtered to yield 5.01 grams (92.7% yield) of 5,5′-bis(2-hydroxy-1,3,2-benzodioxaborole). Chemical analysis of the product yielded the following data:

Calculated for $C_{12}H_8B_2O_6$: C=53.41%, H=2.99%, B=8.02%. Found in product: C=52.65%, H=3.09%, B=7.97%.

The following list is illustrative of the 5,5′-bis(2-oxy-1,3,2-benzodioxaboroles) which can be prepared in this manner, and which are applicable to the present invention:

5,5′-bis(2-hydroxy-1,3,2-benzodioxaborole)
5,5′-bis(2-methoxy-1,3,2-benzodioxaborole)
5,5′-bis(2-ethoxy-1,3,2-benzodioxaborole)
5,5′-bis(2-n-propoxy-1,3,2-benzodioxaborole)
5,5′-bis(2-isopropoxy-1,3,2-benzodioxaborole)
5,5′-bis(2-n-hexyloxy-1,3,2-benzodioxaborole)
5,5′-bis(2-sec-butoxy-1,3,2-benzodioxaborole)
5,5′-bis(2-n-octyloxy-1,3,2-benzodioxaborole)
5,5′-bis(2-phenoxy-1,3,2-benzodioxaborole)
5,5′-bis(2-cresyloxy-1,3,2-benzodioxaborole)

The second group of reactants applicable to the present invention are the dihydric alcohols having the formula

HO—X—OH where X is either an alkylene radical of from 2 to 20 carbon atoms in length and containing a total of from 2 to 20 carbon atoms, a cycloalkylene radical, the cyclic portion of which is of from 4 to 6 carbon atoms and which contains a total of from 4 to 20 carbon atoms, or a 1,3-phenylene or a 1,4-phenylene radical. Thus, these compounds are either alkylene diols, cycloalkylene diols, 1,3-phenylene diol, or 1,4-phenylene diol.

It will be noted here that the alkylene diols applicable to the present invention include both branched and straight-chain alkylene groups, and also include diols having the two hydroxyl groups bonded to alkylene radicals where the chain also includes olefinic groups, acetylenic groups, cycloalkyl groups, or phenyl groups. The cycloalkylene diols are those diols having the two hydroxyl groups bonded directly to the cyclic portion of the cycloalkylene radical.

The following list is illustrative of the dihydric alcohols applicable to the present invention:

Resorcinol
Hydroquinone
1,2-diphenyl-1,2-ethanediol
1,2-ethanediol
2,3-dimethyl-2,3-butanediol
1,3-propanediol
2,4-pentanediol
2,3,3,4-tetramethyl-2,4-pentanediol
2,3-dimethyl-1,3-propanediol
1,4-butanediol
2-methyl-2,5-pentanediol
1,4-hexanediol
2,5-dimethyl-2,5-hexanediol
1,7-heptanediol
1,10-decanediol
1,14-tetradecanediol
1,12-octadecanediol
1,18-octadecanediol
1-butenediol-3,4
2-butenediol-1,4
2-butynediol-1,4
2,5-dimethyl-3-hexynediol-2,5
1,4-cyclohexanedicarbinol
1,2-cyclobutanedicarbinol
1,3-benzenedicarbinol
2,2,4,4-tetramethyl-1,3-cyclobutanediol
2,3-dimethyl-1,2-cyclopentanediol
1,3-cyclobutanediol
1,3-cyclopentanediol
1,3-cyclohexanediol
1,4-cyclohexanediol
2,2,5,5-tetramethyl-1,3-cyclohexanediol
1,4-dibenzyl-1,4-cyclohexanediol
2,5,5-trimethyl-1,4-cyclohexanediol The solvents applicable to the present invention must be inert to the reactants and to the desired products. The common aromatic hydrocarbon solvents, ethers, alkoxy and chloro-substituted aromatic hydrocarbons, and organo-substituted acetamides are all suitable for this purpose. The following list is illustrative of these compounds:

Benzene
Toluene
Xylene
Monochlorobenzene
Dichlorobenzene
Anisole
Veratrole
N,N-dimethylacetamide
Diethyleneglycol dimethyl ether (diglyme)
Tetraethyleneglycol dimethyl ether (tetraglyme)

It is to be clearly understood that the foregoing lists of compounds are only a partial enumeration of the reactants and solvents applicable to the present invention and are not intended to limit the invention.

So that the present invention can be more clearly understood, the following examples are given for illustrative purposes:

III

To 120 ml. of tetraglyme in a 500 ml. round-bottomed flask was added 6.13 grams (0.0145 mole) of 5,5'-bis(2-phenoxy-1,3,2-benzodioxaborole) and 1.60 grams (0.0145 mole) of hydroquinone. The reaction mixture was then heated under reflux for about 4 hours, at which time 2.59 grams, 94.7% of theoretical, of phenol had been removed. The reaction mass was cooled and concentrated by removing a portion of the tetraglyme by distillation at reduced pressure. The suspended solids were separated by filtration, washed with benzene and dried at about 250° C. for about 4 hours, and 4.61 grams of a white powdery polymeric material, M.P. 484°–493° C., was recovered. Chemical analysis of the product yielded the following data:

Calculated for $C_{18}H_{10}B_2O_6$: C=62.86%, H=2.93%, B=6.29%. Found in product: C=62.23%, H=2.75%, B=6.26%.

IV

To 150 ml. of xylene in a 500 ml. round-bottomed flask was added 8.10 grams (0.03 mole) of 5,5'-bis(2-hydroxy-1,3,2-benzodioxaborole) and 4.33 grams (0.03 mole) of 2,2,4,4-tetramethyl - 1,3 - cyclobutanediol. The reaction mixture was then heated under reflux for about 6 hours at which time 1.03 grams, 95.5% of theoretical, of water had been removed. The reaction mass was cooled and concentrated by removing a portion of the xylene by distillation at reduced pressure. The suspended solids were separated by filtration, washed with benzene and dried at about 150° C. for about 4 hours to yield 10.30 grams of a white, powdery polymeric material. Chemical analysis of the product yielded the following data:

Calculated for $C_{20}H_{20}B_2O_6$: C=63.55%, H=5.35%, B=5.72%. Found in product: C=62.79%, H=5.40%, B=5.79%.

V

To 120 ml. of diglyme in a 500 ml. round-bottomed flask was added 8.15 grams (0.025 mole) of 5,5'-bis(2-ethoxy-1,3,2-benzodioxaborole) and 2.75 grams (0.025 mole) of resorcinol. The reaction mixture was then heated under reflux for about 5 hours at which time 2.21 grams, 96.3% of theoretical, of ethanol had been removed. The reaction mass was cooled and concentrated by removing a portion of the diglyme at reduced pressure by distillation. The suspended solids were separated by filtration, washed with benzene and dried at about 250° C. for about 3 to 4 hours, and 7.89 grams of a white, powdery polymeric compound, M.P. 360°–370° C., was recovered. Chemical analysis of the product yielded the following data:

Calculated for $C_{18}H_{10}B_2O_6$: C=62.86%, H=2.93%, B=6.29%. Found in product: C=62.19%, H=2.80%, B=6.32%.

VI

To 125 ml. of veratrole in a 500 ml. round-bottomed flask was added 11.46 grams (0.03 mole) of 5,5'-bis(2-n-butoxy-1,3,2-benzodioxaborole) and 3.55 grams (0.03 mole) of 2-methyl-2,4-pentanediol. The reaction mixture was then heated under reflux for about 6 hours at which time 4.19 grams, 94.2% of theoretical, of n-butanol had been removed. The reaction mass was cooled and concentrated by removing a portion of the veratrole by distillation at reduced pressure. The suspended solids were separated by filtration, washed with benzene and dried at about 150° C. for about 4 hours to yield 9.51 grams of a white, powdery polymeric material. Chemical analysis of the product yielded the following data:

Calculated for $C_{18}H_{18}B_2O_6$: C=61.42%, H=5.14%, B=6.15%. Found in product: C=60.87%, H=5.30%, B=6.19%.

VII

To 120 ml. of toluene in a 500 ml. round-bottomed flask was added 10.62 grams (0.03 mole) of 5,5'-bis(2-n-propoxy-1,3,2-benzodioxaborole) and 2.58 grams (0.03 mole) of 2-butenediol-1,4. The reaction mixture was then heated under reflux for about 5 hours at which time 3.44 grams, 95.3% of theoretical, of n-propanol had been removed. The reaction mass was cooled and concentrated by removing a portion of the toluene by distillation at reduced pressure. The suspended solids were separated by filtration, washed with benzene, and dried at about 150° C. for about 4 hours to yield 8.84 grams of a white, powdery polymeric material. Chemical analysis of the product yielded the following data:

Calculated for $C_{16}H_{12}B_2O_6$: C=59.70%, H=3.76%, B=6.72%. Found in product: C=59.13%, H=3.51%, B=6.79%.

A second satisfactory method for preparing the present organoboron polymers involves reacting an applicable diol directly with the reaction mass derived from the preparation of the 5,5'-bis(2-oxy-1,3,2-benzodioxaborole) reactant without separating the borole from the reaction mass. The following examples are illustrative of this method for preparing the present organoboron polymers.

VIII

A solution of 7.52 grams (0.04 mole) of triisopropyl borate in 10 ml. of veratrole was added to a stirred solution of 4.36 grams (0.02 mole) of bis(3,4-dihydroxyphenyl) in 100 ml. of veratrole. The solution was then heated under reflux for about 3 hours at which time 4.80 grams of isopropanol had been removed. The reaction mixture was then cooled to about 50° C. and 2.20 grams (0.02 mole) of hydroquinone was added. The resultant mixture was then heated for about another 3 hours under reflux at which time 2.30 grams of isopropanol had been removed. Solids began to form as the reaction mass was cooled and the suspension was concentrated by removing a portion of the veratrole by distillation at reduced pressure. The solids were then recovered by filtration, and dried at about 250° C. for about 4 hours to yield 6.16 grams of a white, powdery polymeric material, M.P. 489°–498° C. Chemical analysis of the product yielded the following data:

Calculated for $C_{18}H_{10}B_2O_6$: C=62.86%, H=2.93%, B=6.29%. Found in product: C=62.18%, H=3.01%, B=6.27%.

IX

A solution of 9.20 grams (0.04 mole) of tri-n-butyl borate in 10 ml. of veratrole was added to a stirred solution of 4.36 grams (0.02 mole) of bis(3,4-dihydroxyphenyl) in 100 ml. of veratrole. The solution was then heated under reflux for about 2 hours at which time 6.0 grams of n-butanol had been removed. The solution was cooled and 2.20 grams (0.02 mole) of resorcinol was added. The resultant mixture was then heated for about 3 hours under reflux at which time 2.79 grams of butanol had been removed. The reaction mass was then cooled and as the veratrole was being removed by distillation at reduced pressure solids began to precipitate. The veratrole was removed and the remaining solids were suspended in benzene and recovered by filtration. The solids were then dried at about 250° C. for about 5 hours to yield 5.29 grams of a white, powdery polymeric material, M.P. 365°–370° C. Chemical analysis of the product yielded the following data:

Calculated for $C_{18}H_{10}B_2O_6$: C=62.86%, H=2.93%, B=6.29%. Found in product: C=61.19%, H=2.81%, B=6.36%.

The polymers of the present invention were subjected to thermogravimetric analysis to determine their thermal stability. The polymeric 1,3- and 1,4-phenylene derivatives were heated at a constant temperature increase of 150° C. per hour at a pressure of about $10^{-4}$ mm. Hg. The recorded weight losses for these materials at 500° C. were in the range of from about 4 to about 10 percent.

Other modes of applying the principle of the invention may be employed, change being made as regards the details described, provided the features stated in any of the following claims or the equivalent of such be employed.

We, therefore, particularly point out and distinctly claim as our invention:

1. Solid, thermally stable organoboron polymers consisting essentially of the recurring structural unit

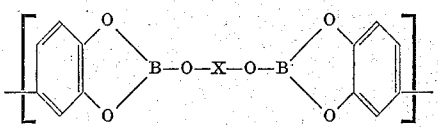

where X is selected from the group consisting of alkylene radicals of from 2 to 20 carbon atoms in length and containing a total of from 2 to 20 carbon atoms, cycloalkylene radicals the cyclic portion of which is of from 4 to 6 carbon atoms and containing a total of from 4 to 20 carbon atoms, 1,3-phenylene and 1,4-phenylene.

2. Solid, thermally stable organoboron polymers consisting essentially of the recurring structural unit

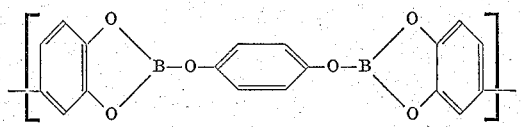

3. Solid, thermally stable organoboron polymers consisting essentially of the recurring structural unit

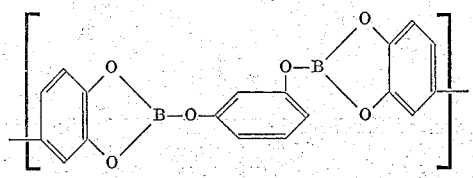

4. Solid, thermally stable organoboron polymers, consisting essentially of the recurring structural unit

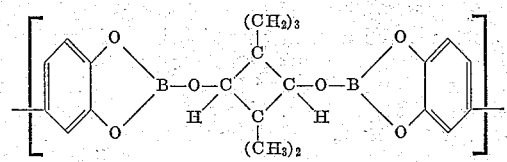

5. Solid, thermally stable organoboron polymers consisting essentially of the recurring structural unit

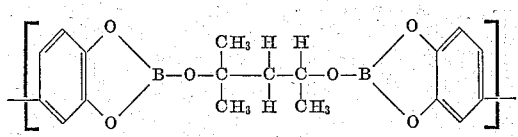

6. Solid, thermally stable organoboron polymers consisting essentially of the recurring structural unit

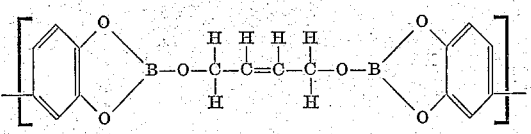

7. The method for preparing solid, thermally stable organoboron polymers consisting essentially of the recurring structural unit

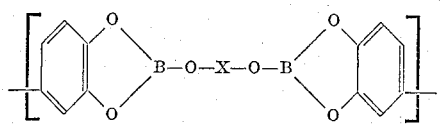

which comprises heating under reflux a mixture of an orthoborate ester of the formula B(OR)₃ and bis(3,4-dihydroxyphenyl) in the presence of a solvent inert to said reactants, continuously removing the alcohol by-product, allowing the resultant reaction mass to cool, adding a diol of the formula HO—X—OH to said reaction mass, heating said mixture under reflux, continuously removing the alcohol by-product and recovering said organoboron polymer from the resultant reaction mass, where X is selected from the group consisting of alkylene radicals of from 2 to 20 carbon atoms in length and containing a total of from 2 to 20 carbon atoms, cycloalkylene radicals the cyclic portion of which is of from 4 to 6 carbon atoms and containing a total of from 4 to 20 carbon atoms, 1,3-phenylene and 1,4-phenylene, and R is selected from the group consisting of alkyl of from 1 to 8 carbon atoms, phenyl and tolyl.

8. The method for preparing solid, thermally stable organoboron polymers consisting essentially of the recurring structural unit

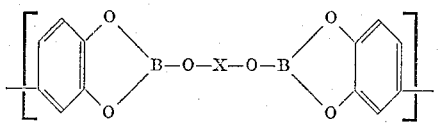

which comprises heating under reflux a mixture of a 5,5'-bis(2-oxy-1,3,2-benzodioxaborale) of the formula

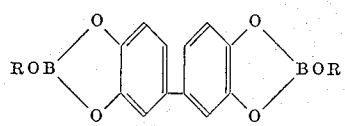

and a diol of the formula HO—X—OH in the presence of a solvent inert to said reactants, continuously removing the reaction by-product by distillation, and recovering said organoboron polymer from the resultant reaction mass, where X is selected from the group consisting of alkylene radicals of from 2 to 20 carbon atoms in length and containing a total of from 2 to 20 carbon atoms, cycloalkylene radicals the cyclic portion of which is of from 4 to 6 carbon atoms and containing a total of from 4 to 20 carbon atoms, 1,3-phenylene and 1,4-phenylene, and R is selected from the group consisting of alkyl of from 1 to 8 carbon atoms, phenyl and tolyl.

9. The method for preparing solid, thermally stable organoboron polymers consisting essentially of the recurring structural unit

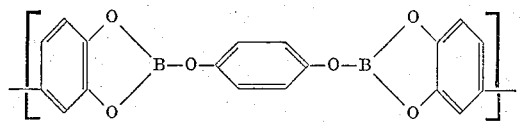

which comprises heating under reflux a mixture of a 5,5'-bis(2-oxy-1,3,2-benzodioxaborole) of the formula

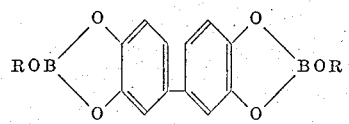

and hydroquinone in the presence of a solvent inert to said reactants, continuously removing the reaction by-product by distillation, and recovering said organoboron polymer from the resultant reaction mass, where R is selected from the group consisting of alkyl of from 1 to 8 carbon atoms, phenyl, tolyl and hydrogen.

10. The method for preparing solid, thermally stable organoboron polymers consisting essentially of the recurring structural unit

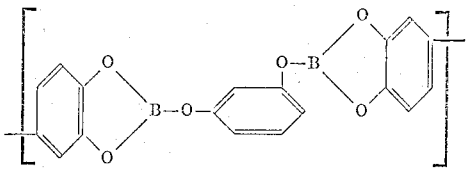

which comprises heating under reflux a mixture of a 5,5'-bis(2-oxy-1,3,2-benzodioxaborole) of the formula

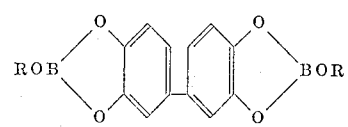

and resorcinol in the presence of a solvent inert to said reactants, continuously removing the reaction by-product by distillation, and recovering said organoboron polymer from the resultant reaction mass, where R is selected from the group consisting of alkyl of from 1 to 8 carbon atoms, phenyl, tolyl and hydrogen.

11. A method for preparing solid, thermally stable organoboron polymers consisting essentially of the recurring structural unit

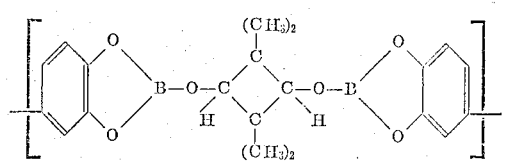

which comprises heating under reflux a mixture of a 5,5'-bis(2-oxy-1,3,2-benzodioxaborole) of the formula

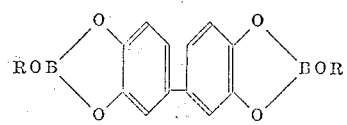

and 2,2,4,4-tetramethyl-1,3-cyclobutanediol in the presence of a solvent inert to said reactants, continuously removing the reaction by-product by distillation, and recovering said organoboron polymer from the resultant reaction mass, where R is selected from the group consisting of alkyl of from 1 to 8 carbon atoms, phenyl, tolyl and hydrogen.

12. The method for preparing solid, thermally stable organoboron polymers consisting essentially of the recurring structural unit

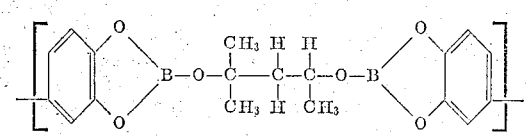

which comprises heating under reflux a mixture of a 5,5'-bis(2-oxy-1,3,2-benzodioxaborole) of the formula

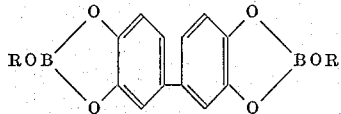

and 2-methyl-2,4-pentanediol in the presence of a solvent inert to said reactants, continuously removing the reaction by-product by distillation, and recovering said organoboron polymer from the resultant reaction mass, where R is selected from the group consisting of alkyl of from 1 to 8 carbon atoms, phenyl, tolyl and hydrogen.

13. The method for preparing solid, thermally stable organoboron polymers consisting essentially of the recurring structural unit

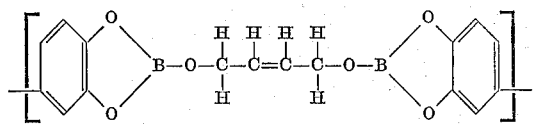

which comprises heating under reflux a mixture of a 5,5'-bis(2-oxy-1,3,2-benzodioxaborole) of the formula

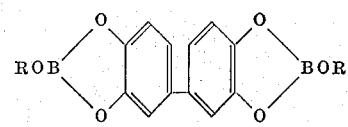

and 2-butenediol-1,4 in the presence of a solvent inert to said reactants, continuously removing the reaction by-product by distillation, and recovering said organoboron polymer from the resultant reaction mass, where R is selected from the group consisting of alkyl of from 1 to 8 carbon atoms, phenyl, tolyl and hydrogen.

References Cited in the file of this patent
UNITED STATES PATENTS

| | | |
|---|---|---|
| 2,457,603 | Salzberg et al. | Dec. 28, 1948 |
| 2,994,713 | Lane | Aug. 1, 1961 |
| 3,014,061 | Trish et al. | Dec. 19, 1961 |